United States Patent [19]

Watashi et al.

[11] Patent Number: 4,607,734

[45] Date of Patent: Aug. 26, 1986

[54] POWER TRANSMITTING DEVICE IN A COPYING MACHINE

[75] Inventors: Masahiro Watashi, Nara; Hiroshi Kimura, Osaka; Kiyoshi Shibata, Osaka; Masahiko Hisajima, Osaka; Kiyonori Yamamoto, Osaka, all of Japan

[73] Assignee: Mita Industrial Co., Ltd., Osaka, Japan

[21] Appl. No.: 573,337

[22] Filed: Jan. 24, 1984

[30] Foreign Application Priority Data

Jan. 25, 1983 [JP] Japan ................ 58-9666[U]

[51] Int. Cl.⁴ ............................................. F16D 11/10
[52] U.S. Cl. .................................... 192/67 R; 192/108
[58] Field of Search .............. 192/67 R, 108, 106.1, 192/106.2, 114 T

[56] References Cited

U.S. PATENT DOCUMENTS 1,706,791  3/1929  Leighton .................... 192/67 R
1,907,619  5/1933  Soden-Fraunhofen ........ 192/67 R
2,592,819  4/1952  Moessinger ................. 192/67 R
2,614,181  10/1952 Consalvi et al. ............. 192/67 R
3,220,522  11/1965 Carter, Jr. ................... 192/67 R
3,358,799  12/1967 Bundschuh .................. 192/67 R
3,491,602  1/1970  New ............................ 192/67 R
3,539,044  11/1970 Grimstad ..................... 192/67 R
3,780,840  12/1973 Thomas ........................ 192/108
3,985,436  10/1978 Tanaka et al. .
4,227,599  10/1980 Ishiwata et al. ............. 192/67 R
4,340,134  7/1982  Reiss ............................ 192/108

Primary Examiner—Henry C. Yuen
Attorney, Agent, or Firm—Finnegan, Henderson, Farabow, Garrett & Dunner

[57] ABSTRACT

A power transmitting device especially suitable for use in photocopying machines includes a driving shaft and a driven shaft. When locking members on the respective shafts are axially disengaged from each other, the driven shaft and the driving shaft are rotatively displaced with respect to each other by a predetermined angle so that the locking members may be freely and positively locked when the driving shaft and driven shaft are axially reengaged.

3 Claims, 6 Drawing Figures

POWER TRANSMITTING DEVICE IN A COPYING MACHINE

FIELD OF THE INVENTION

This invention relates to a power transmitting device, particularly useful in a copying machine, which is adapted to transmit power from a driving shaft in a housing to a driven shaft in a unit which can be pulled out of the housing.

BACKGROUND OF THE INVENTION

In an electrostatic copying machine, including a copying unit comprising a photosensitive drum and a developing device, it is sometimes necessary to pull the copying unit out of the housing in order to perform maintenance work as well as to remove jammed recording sheets or to resupply the developer. Power is transmitted from a driving shaft in the housing to a driven shaft in the copying unit when the copying unit is loaded in the housing and the transmission of power from the driving shaft to the driven shaft is prevented when the copying unit is pulled out of the housing.

In a conventional power transmitting device, the driven shaft is a spline shaft. A boss, namely, a spur gear corresponding in configuration to the spline, is mounted on the driven shaft and is urged toward the driving shaft by a spring. The driving shaft has a spur gear which is engaged with the spur gear of the driven shaft.

A sprocket wheel is fixedly mounted on the driving shaft, and a chain is laid over the sprocket wheel. The chain is driven by a power source such as an electric motor. Tension is maintained on the chain by the sprocket wheel which is engaged with the chain and is energized by a spring. The gear of the driven shaft and the gear of the driving shaft are disengaged from each other when the copying unit is pulled out of the housing. At the same time, the driving shaft becomes freely rotatable and the driving shaft and the gear coupled to the driving shaft are slightly turned (angularly displaced) by the tension given to the chain. This angular displacement makes it difficult for the gears to engage when the copying unit is pushed back in and sometimes causes it to be impossible to transmit power.

OBJECTS AND SUMMARY OF THE INVENTION

An object of this invention is a power transmitting device for a copying machine in which power is positively transmitted from a driving shaft in a housing to a driven shaft provided in a unit which can be pulled out of the housing.

Another object of the present invention is a power transmitting device wherein a driving shaft and a driven shaft can be axially displaced with respect to each other between an engaged, power transmitting position and a disengaged position.

Still another object of the present invention is a power transmitting device wherein a biasing device rotates a driving shaft to a predetermined orientation following disengagement with a driven shaft to facilitate subsequent engagement of the driving shaft and the driven shaft.

These and other objects and features of the invention are accomplished by a power transmitting device comprising a rotatable driving shaft having a first end, a rotatable driven shaft having a first end adjacent to the first end of the driving shaft, the driving shaft and the driven shaft being axially displaceable with respect to each other between an engaged position wherein the driving shaft transmits power to the driven shaft and a disengaged position, means for locking the first end of the driving shaft to the first end of the driven shaft when the shafts are in the engaged position in a manner permitting relative rotation of the driving shaft with respect to the driven shaft within a predetermined angle $\theta_3$ prior to the transmission of power, and means for rotating through a predetermined angle $\theta_1$ one of the driving shaft and the driven shaft relative to the other of the driving shaft and the driven shaft responsive to the disengaging of the driving shaft and the driven shaft to facilitate the subsequent reengagement of the driving shaft and the driven shaft and the transmission of power.

BRIEF DESCRIPTION OF THE DRAWINGS

These and other objects, features, and advantages of the invention, as well as the invention itself, will become more apparent to those skilled in the art when considered in the light of the accompanying drawings wherein.

DETAILED DESCRIPTION OF THE PREFERRED EMBODIMENT

Figure 1:
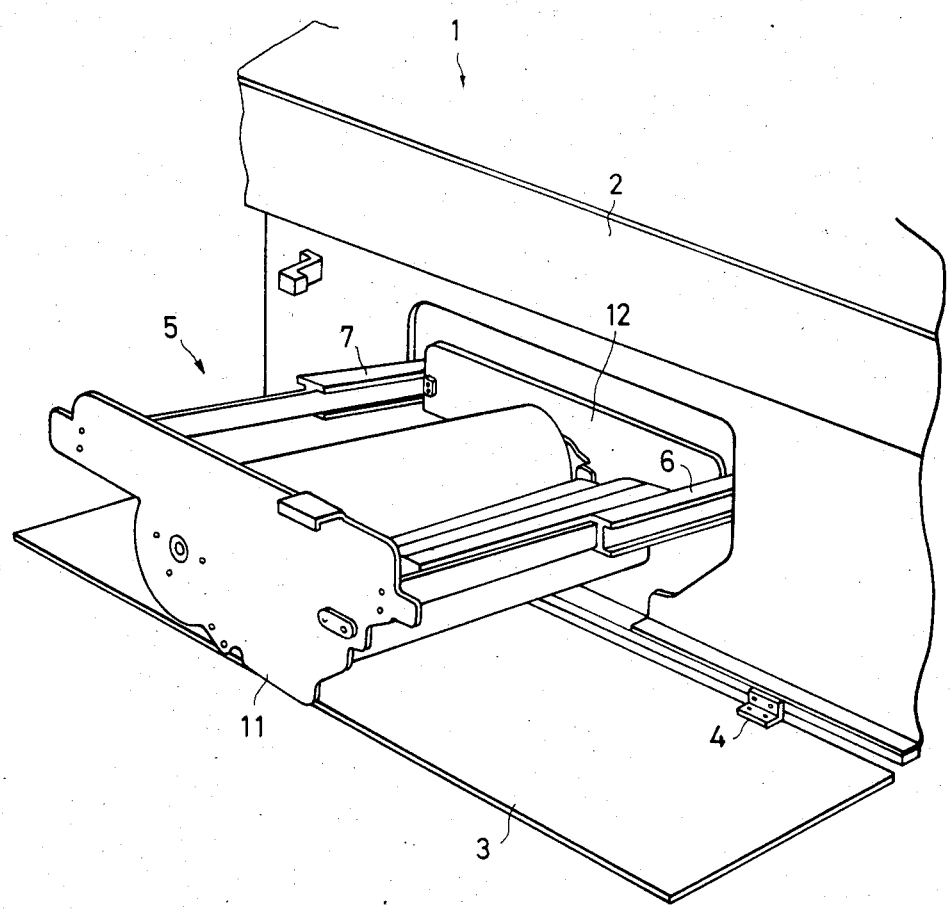
FIG. 1 is a perspective view of a part of a transfer-type electrostatic copying machine.

FIG. 1 is a perspective view showing a part of a transfer type electrostatic copying machine 1 according to the embodiment of the invention. After a front plate 3 of a housing 2 is opened with the aid of hinges 4, a copying unit 5 may be pulled out of the housing 2 by means of a pair of rails 6 and 7 to perform maintenance work such as removal of jammed copying sheets or resupply of developer.

Figure 2:
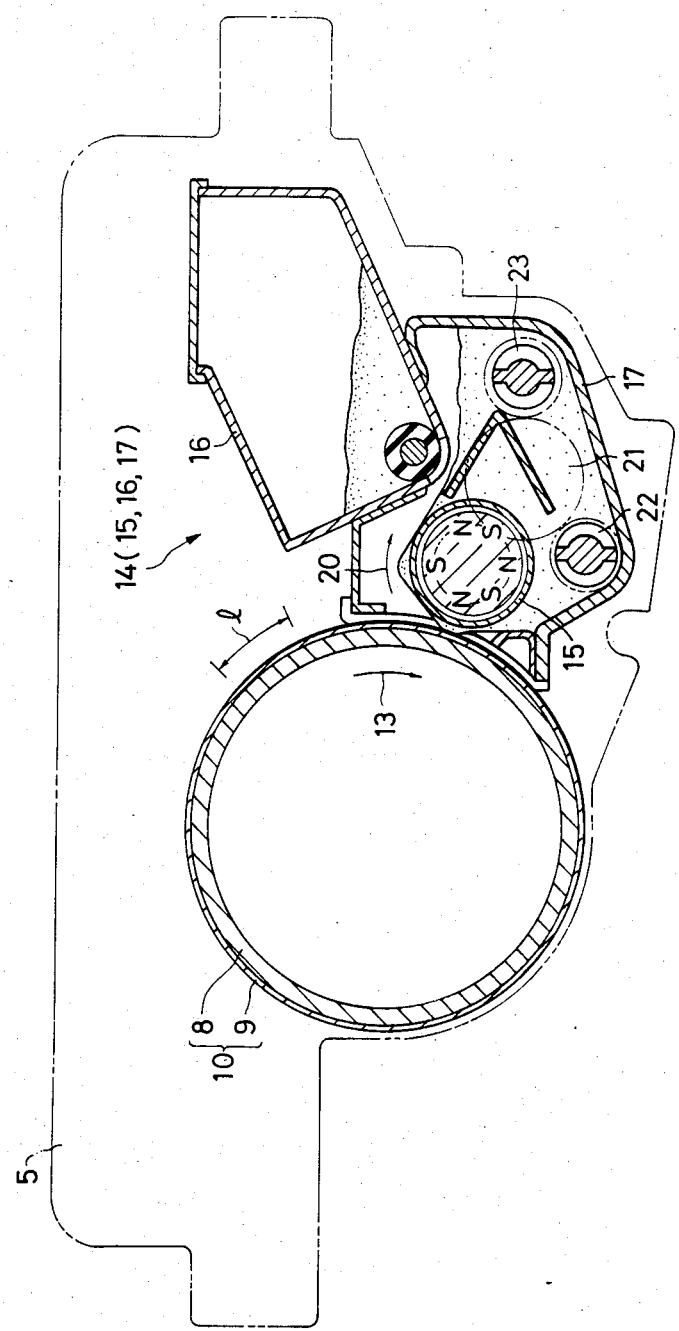
FIG. 2 is a simplified longitudinal cross-sectional view of the copying machine of FIG. 1.

FIG. 2 is a simplified longitudinal cross-sectional view of the copying unit 5. A photosensitive drum 10 comprising a drum 8 and a photosensitive layer 9 is rotatably supported by the front side plate 11 (FIG. 1) and the rear side plate 12 of the copying unit 5. The electrostatic latent image of an original is formed in a region l of the surface of the photosensitive drum 10 by an exposing device (not shown) provided in the housing 2.

As the drum 10 rotates in the direction indicated by the arrow 13, the latent image is developed into a toner image by a developing device 14. The toner image is transferred onto a copying sheet by a transferring corona discharger provided in the housing 2 and is then fixed by a fixing device. The copying sheet thus treated in discharged out of the housing 2.

Figure 3:
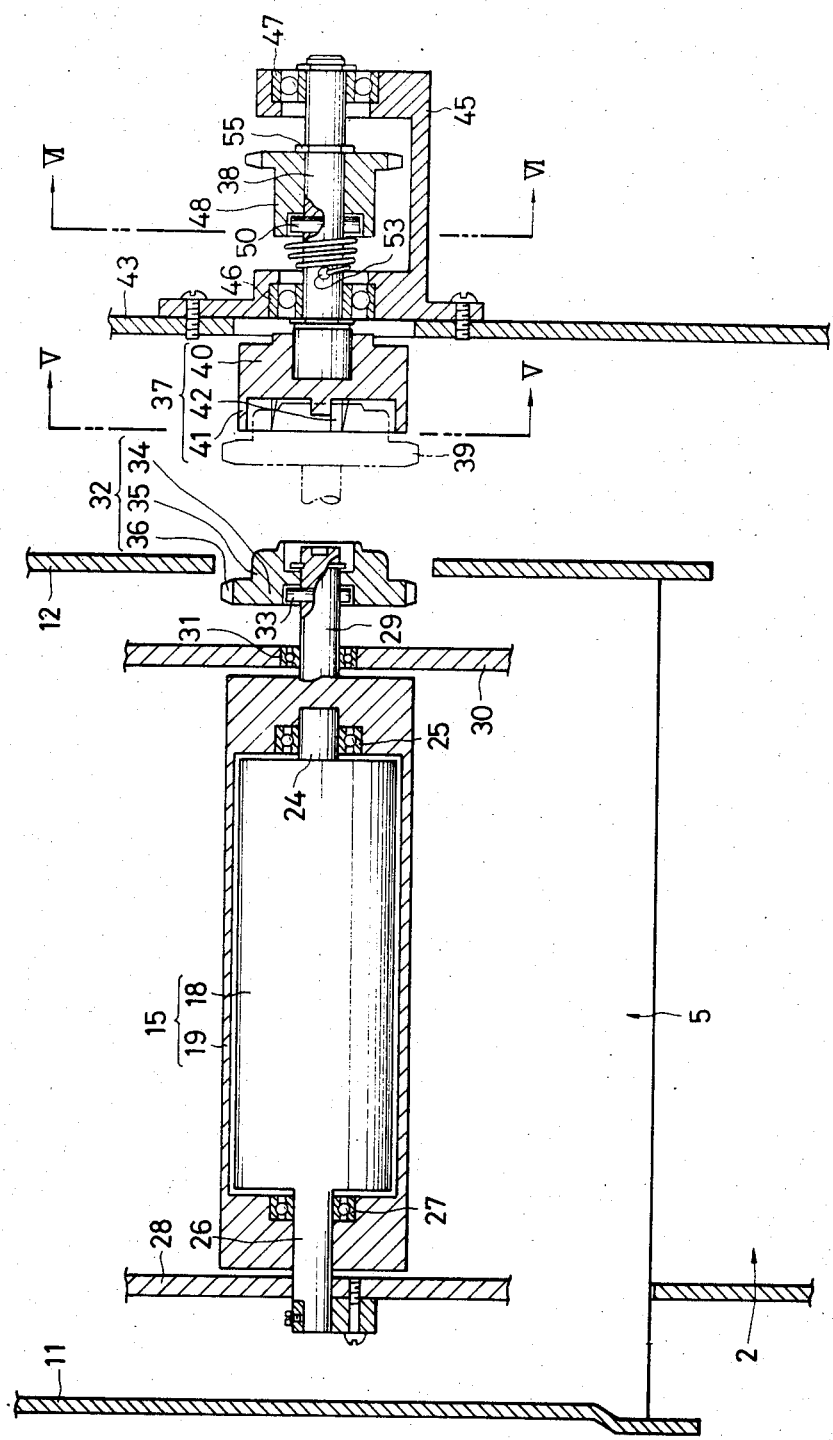
FIG. 3 is a transverse cross-sectional view of the copying machine of FIG. 1.

The developing device 14 comprises: a developing roller 15 having an axis parallel with the axis of the photosensitive drum 10, a toner supplying tank 16 for supplying toner, and a toner receiving tank 17 into which toner drops from the tank 16. The developing roller 15, as shown in FIG. 3, comprises a cylindrical permanent magnet 18 and a cylindrical developing sleeve 19 surrounding the permanent magnet 18. A gear integral with the developing sleeve 19 is turned in the direction of the arrow 20 in FIG. 2 by a drive source, so that stirring members 22 and 23 in the tank 17 are turned through a gear 21 engaged with the aforementioned gear, thus stirring the developer therein.

FIG. 3 is a longitudinal cross-sectional view of the copying device of FIG. 1. A shaft 24 is provided at one end of the permanent magnet 18 of the developing roller 15 and is rotatably supported by a bearing 25 provided in one end of the developing sleeve 19. A shaft 26 is provided at the other end of the permanent magnet 18 and penetrates the developing sleeve 19 while being supported by a bearing 27 in the sleeve 19. The shaft 26 is secured to a side wall 28 on the side of the front side plate 11 of the developing device 14.

A driven shaft 29 is provided at one end of the developing sleeve 19 to turn the developing sleeve 19. The driven shaft 29 is integral with the shaft 24 and is coaxial with the developing roller 15. The shaft 29 is rotatably supported by a bearing 31 provided in a side wall 30 on the side of the rear side plate 12 of the developing device 14.

The power transmitting device further includes means for locking the first end of the driving shaft 38 to the first end of the driven shaft 29 when the shafts are in the engaged position in a manner permitting relative rotation of the driving shaft 38 with respect to the driven shaft 29 through a first predetermined angle prior to the transmission of power. As embodied herein, the locking means comrises a first locking member 32 fixedly secured to the end portion of the driven shaft 29. When the copying unit 5 is loaded into the housing 2, the locking member 32 is engaged with a second locking member 37 on the side of the housing 2 as indicated by the phantom line.

The locking member 37 is secured to the end portion of a driving shaft 38 which is coaxial with the driven shaft 29. Accordingly, the driven shaft 29 in the copying unit 5 is moved axially together with the copying unit 5 as the copying unit 5 is pulled out of the housing 2 or pushed back into the housing 2. A locking pin 3, perpendicular to the axis of the driven shaft 29, is secured to the locking member 32, and power is transmitted from the locking member 32 to the driven shaft 29. The boss 34 of the locking member 32 in the copying unit 5 also includes a pair of locking pieces 35 as well as a gear 36 which is engaged with the gear 21 in FIG. 2.

Figure 4:
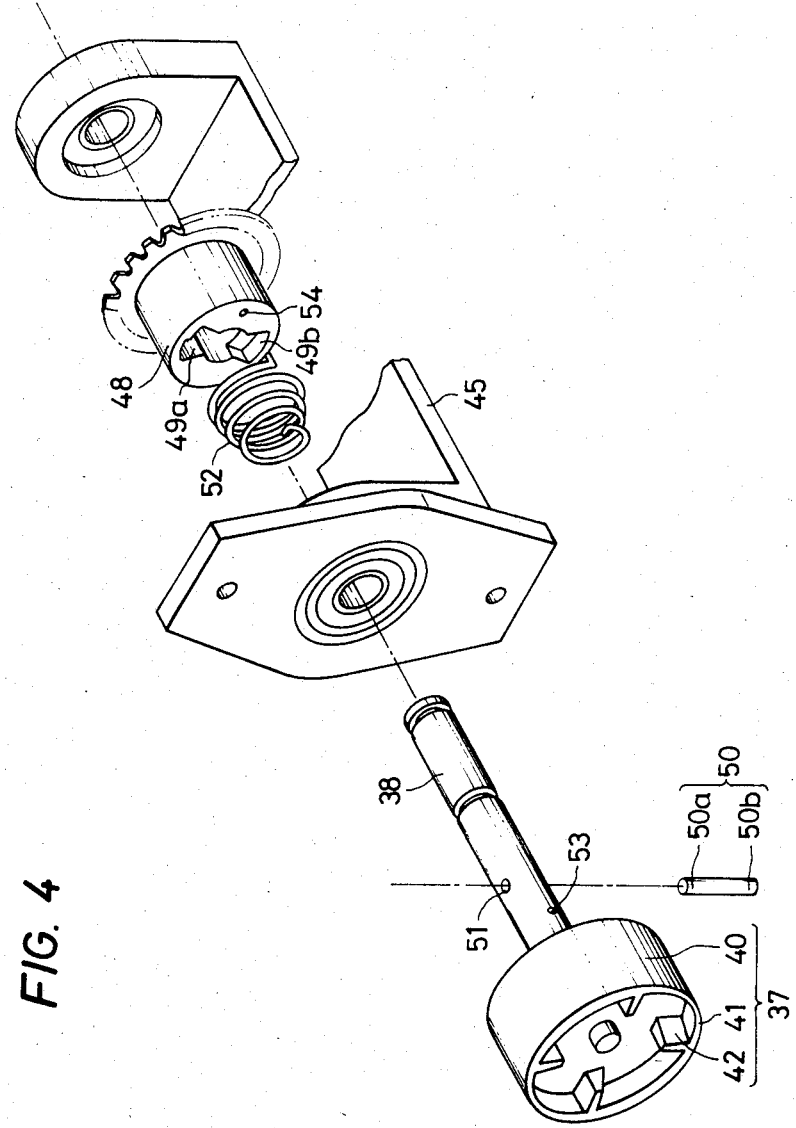
FIG. 4 is an exploded view of the power transmitting device of the present invention.

FIG. 4 is an exploded perspective view showing the locking member 37 and its relevant components. The locking member 37 is secured to the driving shaft 38 of the housing 2 and comprises a boss 40, a cylinder 41 which is integral with the boss 40 and extends axially outwardly of the driving shaft 38, and a plurality of locking pieces 42 which are arranged circumferentially at equal intervals, i.e., angles, on the inside surface of the cylinder 41.

The locking pieces 42 extend radially inwardly from the inner wall of the cylinder 41 and axially outwardly of the end of the driving shaft 38 with respect to the boss 40. The driving shaft 38 is rotatably supported by bearings 46 and 47 fitted in a bracket 45 which is secured to a side wall 43 on the rear side of the housing 2.

The aforementioned boss 40 of the locking member 37 is fixedly secured to one end portion of the driving shaft 38. A sprocket wheel 48 is loosely mounted around the driving shaft 38 between the bearings 46 and 47 in the bracket 45. A chain (not shown) to which tension is given by a drive source (not shown) is laid over the sprocket wheel 48.

The sprocket wheel 48 has a pair of locking recesses 49a and 49b formed symmetrically with respect to the axis of the sprocket wheel 48. The locking recesses are sectorial in a section perpendicular to the axis of the sprocket wheel 48 as shown in FIG. 4.

A locking pin 50 is inserted into a mounting hole 51 of the driving shaft 38 in a manner that it is perpendicular to the axis of the driving shaft 38 and extends outside of the driving shaft 38 at both ends. The two end portions 50a and 50b of the locking pin 50 are engageable with the locking recesses 49a and 49b of the sprocket wheel 48, respectively, so that the sprocket wheel 48 is coupled to the driving shaft 38.

The driving shaft 38 extends through means for rotating through a second predetermined angle one of said driving shaft and said driven shaft responsive to the disengaging of the driving shaft and the driven shaft to facilitate the subsequent reengagement of the driving shaft and the driven shaft and the transmission of power. As embodied herein, the rotating means comprises a coilshaped torsion spring 52. One end of the spring 52 is inserted into a mounting hole 53 cut in the driving shaft 38, and the other end is inserted into a mounting hole 54 formed in one end face of the boss of the sprocket wheel 48. Accordingly, the driving shaft 38 and the sprocket wheel 48 can be angularly displaced relative to each other by the elastic force of the torsion spring 52, and the angular displacement depends on the angle of rotation of the locking recesses 49a and 49b in which the locking pin 50 is inserted.

The other end face of the sprocket wheel 48, which is opposite to the end face of the sprocket wheel 48 on which the torsion spring 52 is provided, abuts against stopper 55, such as snap ring mounted on the driving shaft 38, to prevent the axial movement of the sprocket wheel 48 towards the bearing 47 (to the right in FIG. 3).

Figure 5:
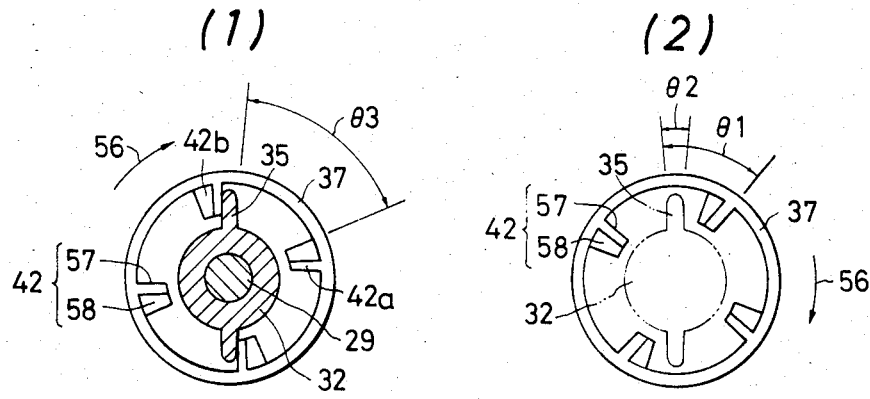
FIG. 5 is a cross-sectional view of the copying machine of FIG. 3 taken along the line V—V.
Figure 6:
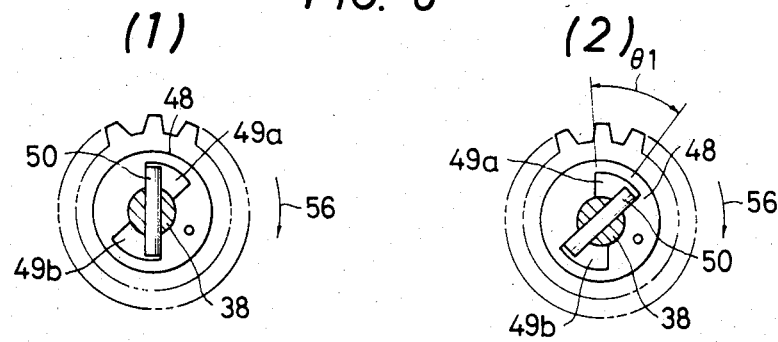
FIG. 6 is a cross-sectional view of the copying machine of FIG. 3 taken along the line VI—VI.

FIG. 5 is a cross-sectional view taken along the line V—V in FIG. 3, and FIG. 6 is a cross-sectional view taken along the line VI—VI in FIG. 3.

As shown in FIG. 5, the locking member 37 is secured to the driving shaft 38 and has a plurality of locking pieces 42 (four locking pieces in the embodiment) as described above. Each locking piece 42 has an abutment surface 57 on the downstream side in the direction of rotation of the driving shaft 38 as indicated by the arrow 56 and a slanting surface 58 on the upstream side. When the locking members 32 and 37 are adjacent to each other with the copying unit 5 pushed into the housing, the locking members 32 and 37 are angularly displaceable relative to each other within a predetermined angle $\theta_3$. This angle is defined by the movement of the locking piece 35 of the locking member 32 from the locking piece 42a on the downstream side in the direction of rotation of the locking member 37 to the abutment surface 57 of the locking piece 42b on the upstream side. During rotation, the locking pieces 35 of the locking member 32 of the driven shaft 29 are abutted against corresponding surfaces 57 of the locking pieces 42 of the locking member 37 of the driving shaft 38, as shown in the part (1) of FIG. 5, so that the power of the driving shaft 38 is transmitted to the driven shaft 29.

As shown in part (1) of FIG. 6, the ends of the locking pin 50 extending out of the driving shaft 38, are abutted against side walls, on the upstream side in the direction of rotation as indicated by the direction of the arrow 56, of the locking recesses 49a and 49b cut in the sprocket wheel 48. Accordingly, as the sprocket wheel 48 rotates in the direction of the arrow 56, the driving shaft 38 is rotated in the same direction.

When the copying unit 5 is pulled out of the housing 2, the driven shaft 29 is displaced axially, so that the locking members 32 and 37 are disengaged from each other. In this operation, the locking member 37 of the driving shaft 38 is turned through an angle $\theta_1$ in the direction of the arrow 56 by the action of the torsion spring 52 as shown in FIG. 5. The angle $\theta_1$ is selected to be smaller than the angle $\theta_3$ and larger than an angle $\theta_2$ through which the driving shaft 38 is turned by the tension of the chain laid over the sprocket wheel 48 when the driving shaft 38 becomes rotatable with the copying unit pulled out.

When the copying unit 5 is pushed back into the housing 2, the locking pieces 35 of the locking member 37 of the driven shaft 29 will not abut against the locking pieces 42 of the locking member 37 of the driving shaft 38. The angle $\theta_1$ through which the locking member 37 of the driving shaft 38 may traced is limited as shown in the part (2) of FIG. 6, by the locking pin 50 being secured to the driving shaft 38 and abutting against the side walls of the locking recesses 49a and 49b cut in the sprocket wheel 48. That is, the angle $\theta_1$ is defined by the angle of the locking recesses 49a and 49b.

In an alternate embodiment of the invention, the mounting hole 51 of the driving shaft 38 is made larger in the circumferential direction and the locking pin 51 is installed to be angularly displaceable, so that the above-described angle $\theta_1$ is determined by the abutment of the locking pin 50 against the mounting hole 51.

When the locking member 37 of the driving shaft 38 is disengaged from the locking member 32 of the driven shaft 29 with the copying unit 5 pulled out of the housing 2, these locking members are turned relative to each other by the elastic force of the torsion spring 52 on the driving shaft 38 so that the locking pieces 35 may not abut against the locking pieces 42. Accordingly, the power transmitting device of the present invention, unlike the prior art, avoids the difficulty that, when the copying unit is loaded in the housing, the gear of the driving shaft is not engaged with the gear of the driven shaft or the locking member of the driving shaft is not locked to the locking member of the driven shaft, thus, being unable to transmit power.

In the above-described embodiment, the torsion spring 52 is provided on the side of the driving shaft 38, so that the locking member 37 of the driving shaft 38, is angularly displaced (turned) by the elastic force of the torsion spring 52. However, the embodiment may be modified so that the torsion spring 52 is provided on the side of the driven shaft 29. In this case, the locking member 32 of the driven shaft 29 is angularly displaced by the elastic force of the spring 52, but the locking member 37 of the driving shaft 38 is maintained fixed so that it may not turn.

In the above-described embodiment, the angular displacement $\theta_1$ of the locking member 37 is defined by the abutment of the locking pin 50 against the downstream side walls of the locking recesses 49a and 49b. However, the displacement $\theta_1$ of the locking member 37 may also be defined by the force of restoration of the torsion spring 52. Furthermore, the present invention has been described with reference to a copying unit although the technical concept may be advantageously employed whenever a driven shaft and a driving shaft must be coupled together and also be axially disengageable.

While the salient features of the invention have been described with reference to the drawings, it should be understood that the described embodiment is susceptible of modification without departing from the spirit and scope of the following claims.

What is claimed is:

1. A power transmitting device comprising:
    a rotatable drive shaft having a first and second end;
    a rotatable driven shaft coaxially aligned with said driving shaft and having a first end proximate said first end of said driving shaft;
    a first coupling member connected to said first end of said driving shaft;
    a second coupling member connected to said first end of said driven shaft, said driving shaft and said driven shaft being axially displaceable between a first position wherein said first coupling member and said second coupling member are engaged to transmit power and a second position wherein said first coupling member is disengaged from said second coupling member;
    first locking pieces formed on said second locking member to extend radially from the axis of said driven shaft;
    second locking pieces formed on said first locking member to extend radially from the periphery thereof toward the axis of said driving shaft, adjacent second locking pieces being separated from each other by a first predetermined angle such that when said driving shaft and said driven shaft are in said first position, said driving shaft and said second coupling member rotate through an angle up to said first predetermined angle before respective first and second locking pieces engage to transmit power from said driving shaft to said driven shaft;
    a driving sprocket rotatably mounted on said driving shaft; and
    a spring connected at one end to said driving sprocket and at the other end to said driving shaft, for rotating said driving shaft through a second predetermined angle, said spring being compressed responsive to said driving shaft and said driven shaft being axially displaced to said first position.

2. A power transmitting device according to claim 1 wherein said driving sprocket includes at least one driving recess extending radially with respect to the axis of said driving shaft and opening in the direction of said first end of said driving shaft, said driving recess extending through a circumferential angle equal to said second predetermined angle, and wherein said driving shaft includes a radial projection engageable with said driving recess such that said driving shaft is rotated through an angle up to said second predetermined angle without causing said sprocket wheel and said driving shaft to rotate together.

3. A power transmitting device comprising:
    a rotatable driving shaft having a first end;
    a rotatable driven shaft having a first end adjacent to said first end of said driving shaft, said driving shaft and said driven shaft being axially displaceable with respect to each other between an engaged position wherein said driving shaft transmits power to said driven shaft and a disengaged position;
    means for locking said first end of said driving shaft to said first end of said driven shaft when said shafts are in said engaged position in a manner permitting relative rotation of said driving shaft with respect to said driven shaft within a predetermined angle $\theta_3$ prior to said transmission of power;

means for rotating said driving shaft through a predetermined angle $\theta_1$ in response to the disengaging of the driving shaft said driven shaft to facilitate the subsequent reengagement of said driving shaft and said driven shaft and said transmission of power;

a sprocket wheel rotatably mounted on said driving shaft adjacent said second end;

a first locking recess formed in said sprocket wheel radially with respect to the axis of said driving shaft;

a locking pin extending through said driving shaft transverse to the axis thereof and including at least one end engagable with said first locking recess, said locking pin when engaged in said locking recess causing said driving shaft to rotate with said sprocket wheel after the rotation of said sprocket wheel through said predetermined angle $\theta_1$; and said rotating means rotating said driving shaft relative to said driven shaft and comprising a spring fixed at one end to said sprocket wheel and at the other end to said driving shaft, said spring being compressed responsive to the engaging of said driving shaft and said driven shaft, said spring for rotating said driving shaft through said second predetermined angle responsive to the disengaging of said driving shaft and said driven shaft such that said first end of said locking pin is rotated in said first locking recess to engage a surface of said locking recess.

* * * * *